United States Patent
Kelley (10) Patent No.: US 7,937,097 B2
(45) Date of Patent: May 3, 2011

(54) METHOD, SYSTEM, AND COMPUTER PROGRAM PRODUCT FOR ANONYMOUSLY/PRIVATELY EXCHANGING TEXT MESSAGES

(75) Inventor: Jerry Keller Kelley, Richmond, VA (US)

(73) Assignee: Jerry Keller Kelley, Richmond, VA (US)

(*) Notice: Subject to any disclaimer, the term of this patent is extended or adjusted under 35 U.S.C. 154(b) by 714 days.

(21) Appl. No.: 12/037,374

(22) Filed: Feb. 26, 2008

(65) Prior Publication Data
US 2009/0124270 A1 May 14, 2009

Related U.S. Application Data

(60) Provisional application No. 60/891,743, filed on Feb. 27, 2007.

(51) Int. Cl.
*H04W 4/00* (2009.01)

(52) U.S. Cl. ............... 455/466; 455/432.3; 455/415; 709/206

(58) Field of Classification Search ........... 455/466, 455/403, 412.2, 432.3, 435.1, 415; 709/206, 709/207
See application file for complete search history.

(56) References Cited

U.S. PATENT DOCUMENTS

| | | | |
|---|---|---|---|
| 2005/0025300 A1* | 2/2005 | Lagadec et al. | 379/201.11 |
| 2007/0142029 A1* | 6/2007 | Willehadson et al. | 455/405 |
| 2007/0149214 A1* | 6/2007 | Walsh et al. | 455/456.1 |

* cited by examiner

*Primary Examiner* — Kamran Afshar
(74) *Attorney, Agent, or Firm* — Thomas & Karceski, P.C.

(57) ABSTRACT

The present invention provides the ability to anonymously/privately send, receive or exchange text messages. Registered users are given a unique code which is electronically linked to the user's mobile phone number and associated with a common short code of a provider of anonymous message exchange services. Registered users and or marketers may send SMS and MMS messages to other registered users that only display the sender's unique code as identification, thus allowing for anonymous mobile messaging between registered users.

22 Claims, 4 Drawing Sheets

METHOD, SYSTEM, AND COMPUTER PROGRAM PRODUCT FOR ANONYMOUSLY/PRIVATELY EXCHANGING TEXT MESSAGES

CROSS-REFERENCE TO RELATED APPLICATIONS

This application claims priority to provisional U.S. Application No. 60/891,743, filed Feb. 27, 2007, the contents of which are incorporated herein by reference in their entirety.

FIELD OF THE INVENTION

The present invention relates to text messaging to and from mobile telephony devices.

BACKGROUND OF THE INVENTION

Cellular phones, smart phones and other mobile telephony devices (hereinafter, mobile phones) are becoming more and more prevalent, even to the point of replacing landline telephones for many users. Among the services that are commonly available on such mobile phones is Short Message Service (SMS), for sending and receiving short text messages to other mobile phones. SMS is a text message service that enables short messages of generally no more than 140-160 characters in length to be sent to and transmitted from mobile phones. SMS was introduced in the Global System for Mobile communications (GSM) system, and is now supported by all other digital-based mobile communications systems. The use of SMS, or "texting" as it is commonly referred to, is very popular with users of mobile phones, and is often used in a manner similar to instant messaging (IM) services available on the Internet. To send, text messages are keyed into a mobile phone keypad. Received text messages are presented on the mobile telephone's screen.

Messages are sent via a store-and-forward mechanism to a Short Message Service Center (SMSC), which will attempt to send the message to the recipient, and possibly retry, if the user is not reachable at a given moment. Messages may be Mobile Terminated (MT) or Mobile Originating (MO). Mobile Originated messages are sent from a mobile phone, and could be sent either to another mobile phone (such when a mobile subscriber sends a personal message to another subscriber) or to a computer application that will process the message. Mobile Terminated messages are transmitted to a mobile phone, and could be sent by another mobile phone or generated by a computer application.

Typically, messages are addressed to a recipient using the telephone number belonging to the recipients mobile phone. However, a portion of messages that are sent via SMS are not sent to another mobile phone as in a person-to-person communication, but are instead directed to a central location. While the central location could have a regular 10-digit telephone number as does a typical mobile telephone, SMS messages directed to a central location are often directed using a common short code address (typically referred to simply as a "short code"). A short code address is a convenient, easy to remember, short number (or text string that corresponds to a number) that identifies a central location to which an SMS message can be sent. Short codes are significantly shorter than full telephone numbers—typically four to six digits in length. Short codes are widely used for value-added services such as television voting, ordering ringtones, mobile marketing and other mobile services. SMS messages sent to short code numbers are billed by the mobile phone carriers to the mobile phone user at the same rate as SMS messages sent to another mobile phone users number or at a fixed tariff rate ("Premium SMS service") which is made known to the mobile phone user via a required "opt-in."

BRIEF SUMMARY OF THE INVENTION

The present invention provides the ability to anonymously send or exchange text messages. Registered users are given a unique code which is electronically linked to the user's mobile phone number and associated with a common short code of a provider of anonymous mobile phone message exchange services. Registered users may send SMS and MMS messages to other registered users that only display the sender's unique code as identification, thus allowing for anonymous mobile messaging between registered users.

In one embodiment of the invention, a system for anonymously exchanging text messages comprises a controller, a communication element, and a memory element. The controller is configured to receive, via the communication element, a text message from a sending user. The text message comprises a header and a body, the header contains a common short code corresponding to a provider of message forwarding services, the body contains (a) a unique alias corresponding to a desired receiving user and (b) text to be communicated to the receiving user. The controller is further configured to identify a telephone number of the sending user and to determine if the sending user is registered with the provider by comparing the telephone number of the sending user to a database of registered users stored in the memory element. If the sending user is not registered with the provider, the controller is further configured to notify the sending user, via the communication element, that the text message will not be forwarded to the receiving user.

If the sending user is registered with the provider, the controller is further configured to determine a pre-assigned unique alias of the sending user using the database of registered users and compare the unique alias corresponding to the desired receiving user to the database of registered users. If the unique alias corresponding to the desired receiving user is not in the database of registered users, the controller is further configured to notify the sending user, via the communication element, that the text message cannot be forwarded to the receiving user. If the unique alias corresponding to the desired receiving user is in the database of registered users, the controller is further configured to determine a telephone number of the receiving user using the database of registered users, create a new text message to be sent to the receiving user, and send the new text message to the receiving user via the communication element. The new text message comprises a header and a body, the header contains the telephone number of the receiving user and the body contains the text to be communicated to the receiving user and the unique alias of the sending user.

The controller may be further configured to place the text message received from the sending user into a moderation queue to be reviewed (by a person, automatically by software, or by a combination thereof) to determine if the text message is acceptable to forward to the receiving user. The controller may be further configured to notify the sending user, via the communication element, if the text message is determined to be not acceptable. The controller may be further configured to block all messages from the sending user if the sending user sends more than a predetermined maximum number of messages that are determined to be not acceptable.

The controller may be further configured to compare a current time of day and a current day of week to message-receiving time and day preferences specified by the receiving user. If the current time of day and current day of week is not within the message-receiving time and day preferences specified by the receiving user, the controller may be further configured to store the text message from the sending user until the current time of day and current day of week is within the message-receiving time and day preferences specified by the receiving user.

The body of the new text message may further contain advertising text. The controller may be further configured to determine a number of characters of the advertising text, determine a number of characters of the text to be communicated to the receiving user, sum the number of characters of the advertising text and the number of characters of the text to be communicated to the receiving user, and compare the sum to a predetermined maximum number of characters of the new text message to determine if the predetermined maximum number of characters has been exceeded.

In addition to the system for anonymously exchanging text messages, as described above, other aspects of the present invention are directed to corresponding methods and computer program products for anonymously exchanging text messages.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

While embodiments of the invention are described herein in conjunction with text messaging using SMS, it should be appreciated that embodiments of the invention will work in conjunction with any suitable text messaging system and protocol, such as Multimedia Messaging Service (MMS) which enables the sending of text messages that include multimedia objects (images, audio, video, rich text).

Figure 1:
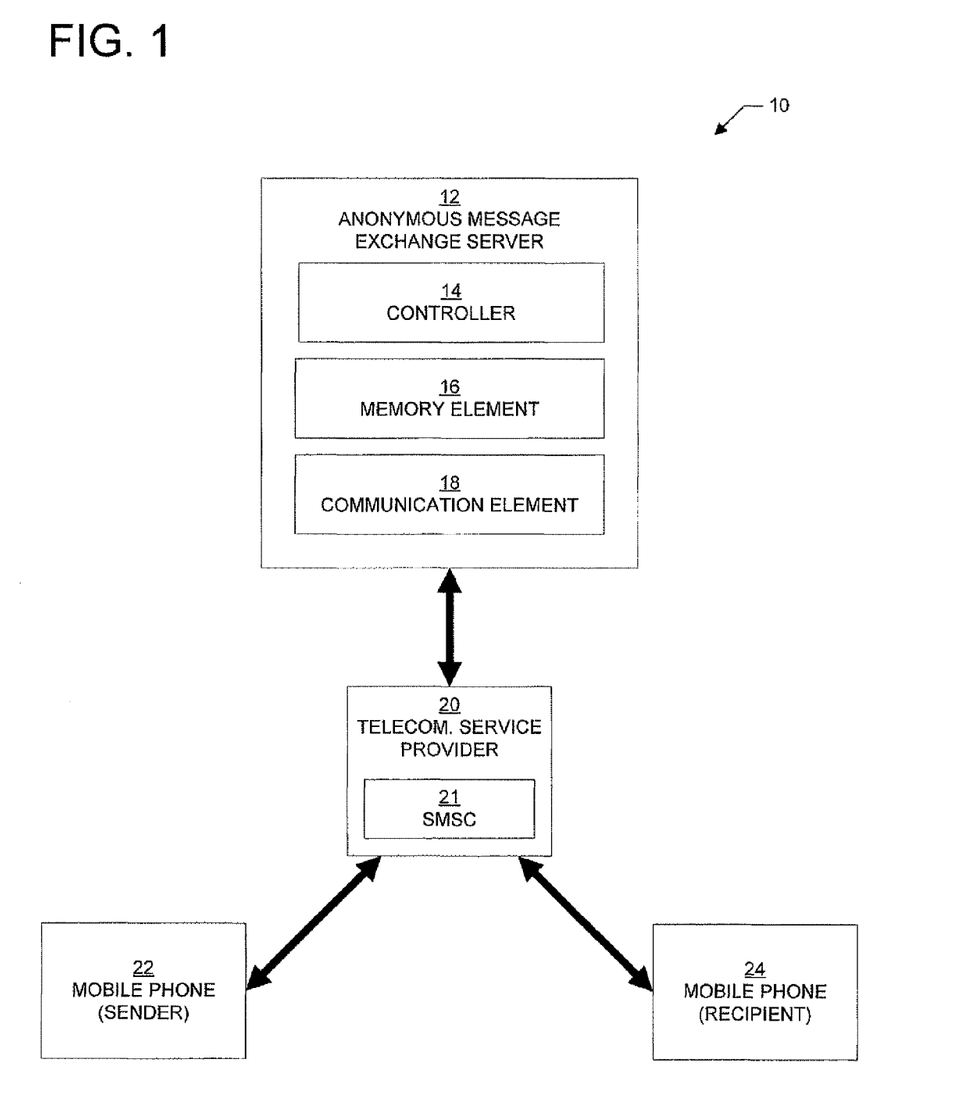
FIG. 1 is a simplified schematic block diagram of a telecommunications network in which embodiments of the present invention may operate.

FIG. 1 is a simplified schematic block diagram of a telecommunications ("telecom") network in which embodiments of the present invention may operate. The network 10 of FIG. 1 comprises an anonymous message exchange server 12, a telecommunications service provider 20, a mobile phone 22 belonging to a sender of a text message, and a mobile phone 24 belonging to the intended recipient of the text message initiated on mobile phone 22. The telecommunications service provider 20 includes a short message service center (SMSC) 21. It should be appreciated that the network 10 of FIG. 1 is a greatly oversimplified representation of a telecommunications network, and only the minimal elements for illustrating the invention are included. In a known text messaging scenario, the user of mobile phone 22 (referred to hereinafter as the sender) creates a text message on the phone. If the sender wishes the message to go to the user of mobile phone 24 (referred to hereinafter as the recipient), the sender addresses the text message to the recipient's mobile telephone number. The text message is then sent from the sender's phone to the telecom service provider 22, where the message is processed in the SMSC 21 and sent on to the recipient's phone. In this known text messaging scenario, the sender must know the recipient's mobile telephone number and the recipient, upon receiving the text message, sees the sender's mobile telephone number.

In many cases, however, it is desirable for the sender and/or the recipient to remain anonymous/private—that is, for the sender to not know the recipient's telephone number and/or for the recipient to not know the sender's telephone number. For example, an organization may have a database of members which includes the members' mobile telephone numbers. The organization may wish to allow, for a fee, a marketer to send marketing text messages to the members without providing the members' telephone numbers to the marketers (e.g., to prevent the marketer from making phone calls to the members). In such an example, the organization would like the recipients (i.e., the members) to remain anonymous. In another example, dating services allow members to post profiles on websites or in newspapers in hopes of attracting interest from someone wanting to date a member. While members may wish to receive text messages from interested parties, members generally do not want to post their telephone numbers as that would enable the members to be identified and may cause them to receive annoying or harassing phone calls. Similarly, the interested party may not want his/her phone number known to the person in whom he/she is interested. Thus, in this example, both the sender and the recipient wish to remain anonymous. Standard SMS text messaging does not enable such anonymity.

Figure 3:
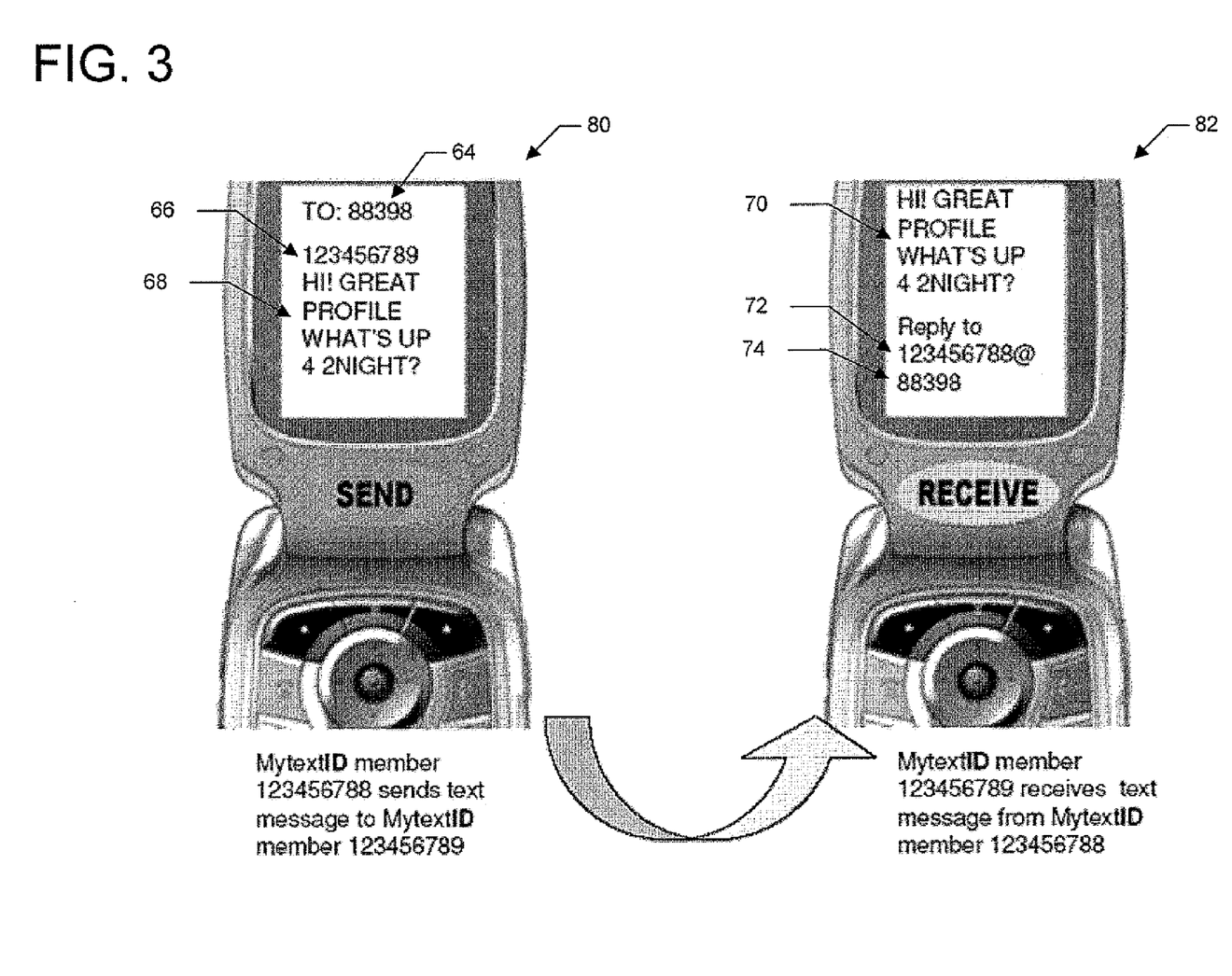
FIG. 3 illustrates the operation of a method for anonymously exchanging text messages, in accordance with one embodiment of the present invention.

In embodiments of the invention, the telecom network includes an anonymous message exchange server 12 in communication with the telecom service provider 20. Users of the invention (including the sender and recipient) are each assigned a unique numeric or alphanumeric identifier (which may be termed an alias) that differs from the user's phone number. The sender creates a text message to be sent to the intended recipient. Rather than addressing the message to the recipient's phone number (which is not known by the sender), the message is addressed to the provider of the anonymous message exchange server using either a standard ten digit phone number or, preferably, using a short code. The recipient's alias is entered into the body of the text message, at the beginning of the message body. The message text to the recipient is entered into the body of the text message, preferably after the recipient's alias. Referring now to FIG. 3, the sender's message 80 is illustrated on the sender's mobile phone prior to being sent. The sender's message is addressed to the short code 64 (i.e., 88398) of the provider of the anonymous message exchange server. The body of the message includes the recipient's alias 66 (i.e., 123456789) and the message text 68.

When the sender transmits the message, the message first goes to the SMSC of the telecom service provider. Based on the short code used to address the message, the SMSC sends the message to the anonymous message exchange server 12.

The anonymous message exchange server may comprise a controller 14, a memory element 16, and a communication element 18 (as illustrated in FIG. 1). The actions occurring in the anonymous message exchange server will be described in conjunction with FIGS. 2A and 2B. The anonymous message exchange server receives, from the SMSC via the communication element, the text message from the sender (block 30). The controller identifies the mobile phone number of the sender from the received message (block 32) and determines if the sender is registered (block 34) by comparing the telephone number of the sender to a database of registered users stored in the memory element 16. The database comprises, at a minimum, the mobile phone numbers and aliases of the registered users. If the sender is not registered, the controller will typically notify the sender that the text message will not be forwarded to the recipient (block 36) and will delete the message (block 38). The notification to the sender may include an invitation and instructions to become a registered user.

Figure 2A:
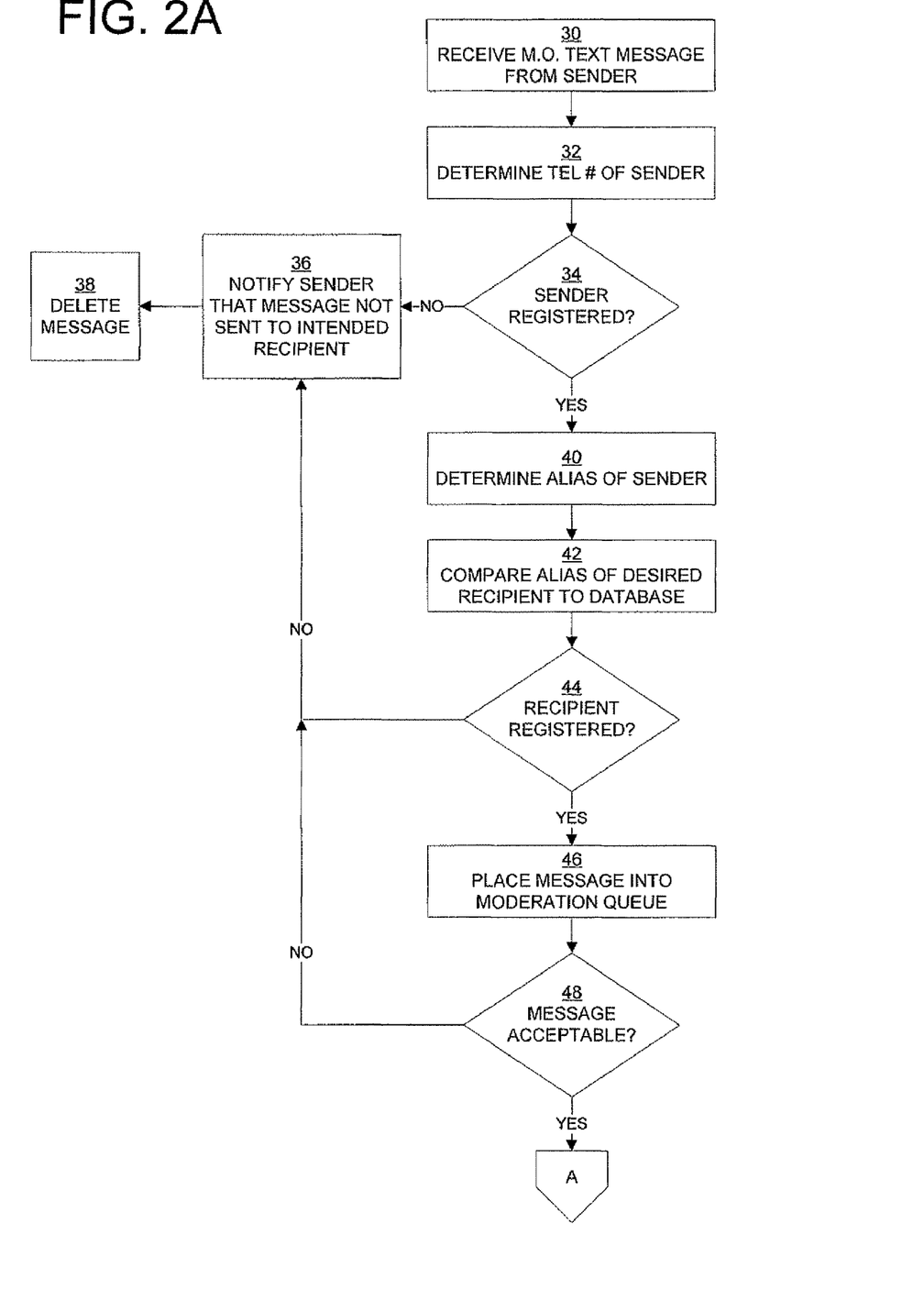
FIGS. 2A and 2B are a flowchart of the operation of a method for anonymously exchanging text messages, in accordance with one embodiment of the present invention.
Figure 2B:
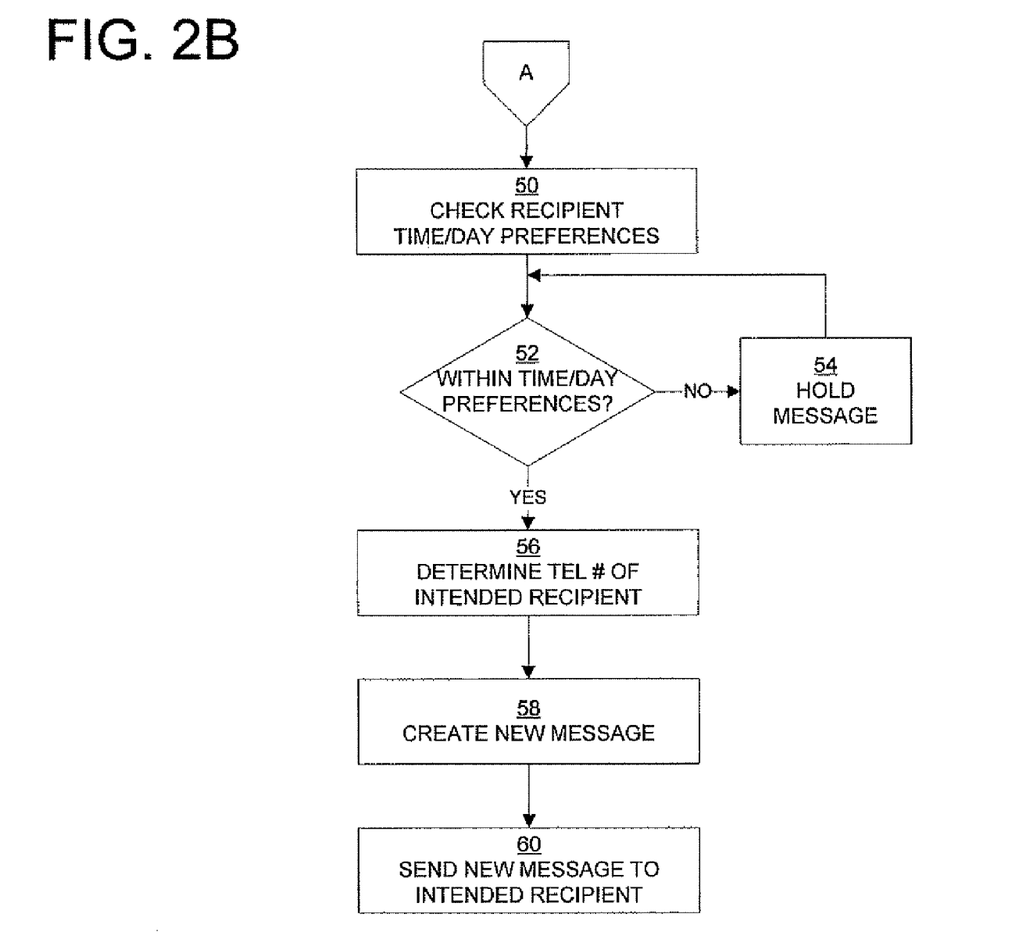

If the sending user is registered with the provider, the controller determines the alias of the sender (block 40) from the database of registered users. The controller compares the alias of the recipient (obtained from the received message) to the database of registered users (block 42) to determine if the recipient is registered (block 44). If the recipient is not registered, the controller will typically notify the sender that the text message will not be forwarded to the recipient (block 36) and will delete the message (block 38).

If the recipient is registered, the controller may place the text message received from the sender into a moderation queue (block 46) to be reviewed by a person or software to determine if the text message is acceptable to forward to the receiving user (block 48). If the message is determined to be not acceptable, the controller will typically notify the sender that the text message will not be forwarded to the recipient (block 36) and will delete the message (block 38). Optionally, the controller may track in the database that a specific sender has sent a message that was not acceptable, and may be configured to block all messages from a sender that has sent more than a predetermined limit of not-acceptable messages.

The database may contain preferences for each user as to the times of day and/or days of the week that the user does not wish to receive messages. As such, the controller may check these preferences (block 50) and determine if the current time of day and current day of the week is within the user's preferences (block 52). If the current time of day or current day of week is not within the message-receiving time and day preferences specified by the receiving user, the controller may hold the text message until the current time of day and current day of week is within the message-receiving time and day preferences specified by the receiving user (block 54).

When the current time of day or current day of week is within the message-receiving time and day preferences specified by the receiving user, the controller will use the database to determine the mobile phone number of the recipient (block 56). The controller will then create a new text message to be sent to the receiving user (block 58) and send the new text message to the recipient (by sending the message to the SMSC which routes the message to the recipient) (block 60). The new text message is addressed using the telephone number of the recipient, and the body contains message text and the alias of the sender.

Referring again to FIG. 3, the message 80 sent to the recipient is illustrated on the recipient's mobile phone after being received. The recipient's message is addressed to the mobile phone number of the recipient (not illustrated). The body of the message includes the sender's alias 72 (i.e., 123456788), the message text 68, and the short code 64 of the provider of the anonymous message exchange server. Providing the short code enables the recipient to readily know how to address a reply message.

Although not illustrated in FIG. 3, the controller may add advertising text to the body of the message. If advertising text is to be added to the message, the maximum number of allowed characters must be taken into consideration. Typically, the number of characters of message text that the sender will be allowed to include will be reduced by the number of characters in the advertising text. Thus, the controller may determine the number of characters of the advertising text and the number of characters of the message text, and compare the sum of these two to the allowed maximum number of characters to determine if the maximum number of characters has been exceeded.

In one specific implementation of embodiments of the invention, a clothing retailer may sell tee shirts (or other clothing items, such as hats, shoes, or coats) each with an individual unique alias and a short code printed on each shirt (along with the retailer's website). When the tee shirt is purchased, the buyer could register his/her unique alias (that is printed on the shirt) at the store or at the retailer's website and create a user profile. The alias would be electronically linked to the buyer's mobile telephone number via the registration process. When this buyer is wearing the shirt, others who see the buyer and the shirt would be able to send a text message to the buyer using the short code and alias. This could allow people to send a text message to the buyer (and other registered users) without either the sender or the recipient (i.e., the buyer) disclosing their mobile phone number. The sender's mobile phone number remains anonymous to the recipient because the message is routed through a short code. If the sender is a registered user, the sender can sign the message (manually or automatically) with the sender's alias. The short code would also be included to enable the recipient to send a return message without knowing the sender's mobile telephone number. Since the messages are routed through a short code, the messages can be filtered and monitored for abusive, offensive, or threatening language. The retailer's website may provide a searchable database of the registered aliases and the profiles of all users. During the registration process, the retailer may ask the buyer if the buyer wishes to opt-in to receive marketing offers (e.g., coupons, etc.). The retailer is able to establish a direct dialogue with the consumers. In addition to printing an individual unique alias and a short code on clothing, the alias and short code may be printed on a variety of items, including but not limited to key chains, bumper stickers, and backpacks.

In another embodiment of the invention, text messages may be broadcast to anonymous recipients. In such an embodiment, a database of potential recipients of text messages is provided. Such a database may be provided, for example, by an organization which may desire to make money by allowing marketers to send messages to members of the organization but does not wish to allow the marketers to know the members' mobile phone numbers. The database typically comprises a mobile telephone number of each potential recipient (e.g., each member of the organization), a pre-assigned unique alias for each potential recipient, and profile data for each potential recipient. The profile data typically comprises a plurality of personal characteristics of each user. The specific personal characteristics that are included will typically vary depending on the nature of the organization, but may include age, gender, interests and hobbies, and physical characteristics. The database will typically include an indication each potential recipient's desire to receive broadcast messages ("opt-in" or "opt-out").

The marketer or other sender will typically use a user interface, such as via a website, to create and send a message. Access to this user interface will typically be controlled, such as by use of password protection. The sender will specify a desired subset of the potential recipients to receive the message by inputting or selecting one or more criteria that correspond to personal characteristics of the desired subset that are included in the database. For example, the sender may be a seller of trendy running shoes and may select characteristics that correspond to potential recipients between the ages of sixteen and thirty who have indicated an interest in athletics. The sender also inputs the text to be communicated to the recipients. The user interface will access the database to identify those potential recipients whose profile data matches the criteria and whose profile indicates a desire to receive such broadcast messages. These identified potential recipients are the desired subset of potential recipients. The user interface will determine, from the database, the telephone number of each potential recipient in the desired subset. The user interface will then create new text messages to be sent to each potential recipient in the desired subset. Each new text message comprises a header and a body, the header contains the telephone number of the respective potential recipient in the desired subset and the body contains the text to be communicated to the desired subset of potential recipients. The new text messages may contain identification of the sender, such as the telephone number or pre-assigned unique alias of the sender. The new text messages are then sent to the desired subset of recipients.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for anonymously exchanging text messages, the method comprising:
    receiving a text message from a sending user, the text message comprising a header and a body, the header containing a common short code corresponding to a provider of message forwarding services, the body containing (a) a unique alias corresponding to a desired receiving user and (b) text to be communicated to the receiving user;
    identifying a telephone number of the sending user;
    determining if the sending user is registered with the provider by comparing the telephone number of the sending user to a database of registered users;
    if the sending user is not registered with the provider, notifying the sending user that the text message will not be forwarded to the receiving user;
    if the sending user is registered with the provider:
        determining a pre-assigned unique alias of the sending user using the database of registered users;
        comparing the unique alias corresponding to the desired receiving user to the database of registered users;
        if the unique alias corresponding to the desired receiving user is not in the database of registered users, notifying the sending user that the text message cannot be forwarded to the receiving user;
        if the unique alias corresponding to the desired receiving user is in the database of registered users:
            determining a telephone number of the receiving user using the database of registered users;
            creating a new text message to be sent to the receiving user, the new text message comprising a header and a body, the header containing the telephone number of the receiving user, the body containing the text to be communicated to the receiving user and the unique alias of the sending user; and
            sending the new text message to the receiving user.

2. The method of claim 1, further comprising:
    placing the text message received from the sending user into a moderation queue; and
    reviewing the text message to determine if the text message is acceptable to forward to the receiving user.

3. The method of claim 2, further comprising:
    notifying the sending user if the text message is determined to be not acceptable.

4. The method of claim 3, further comprising:
    blocking all messages from the sending user if the sending user sends more than a predetermined maximum number of messages that are determined to be not acceptable.

5. The method of claim 1, further comprising:
    comparing a current time of day and a current day of week to message-receiving time and day preferences specified by the receiving user;
    if the current time of day and current day of week is not within the message-receiving time and day preferences specified by the receiving user, storing the text message from the sending user until the current time of day and current day of week is within the message-receiving time and day preferences specified by the receiving user.

6. The method of claim 1, wherein the body of the new text message further contains advertising text.

7. The method of claim 6, further comprising:
    determining a number of characters of the advertising text;
    determining a number of characters of the text to be communicated to the receiving user;
    summing the number of characters of the advertising text and the number of characters of the text to be communicated to the receiving user; and
    comparing the sum to a predetermined maximum number of characters of the new text message to determine if the predetermined maximum number of characters has been exceeded.

8. A system for anonymously exchanging text messages, the system comprising:
    a controller;
    a communication element; and
    a memory element;
    wherein the controller is configured to receive, via the communication element, a text message from a sending user, the text message comprising a header and a body, the header containing a common short code corresponding to a provider of message forwarding services, the body containing (a) a unique alias corresponding to a desired receiving user and (b) text to be communicated to the receiving user;
    wherein the controller is further configured to identify a telephone number of the sending user;
    wherein the controller is further configured to determine if the sending user is registered with the provider by comparing the telephone number of the sending user to a database of registered users stored in the memory element;
    wherein, if the sending user is not registered with the provider, the controller is further configured to notify the sending user, via the communication element, that the text message will not be forwarded to the receiving user;
    wherein, if the sending user is registered with the provider, the controller is further configured to:
        determine a pre-assigned unique alias of the sending user using the database of registered users;
        compare the unique alias corresponding to the desired receiving user to the database of registered users;
        if the unique alias corresponding to the desired receiving user is not in the database of registered users, notify the sending user, via the communication element, that the text message cannot be forwarded to the receiving user;

if the unique alias corresponding to the desired receiving user is in the database of registered users:

determine a telephone number of the receiving user using the database of registered users;

create a new text message to be sent to the receiving user, the new text message comprising a header and a body, the header containing the telephone number of the receiving user, the body containing the text to be communicated to the receiving user and the unique alias of the sending user; and send the new text message to the receiving user via the communication element.

9. The system of claim 8, wherein the controller is further configured to place the text message received from the sending user into a moderation queue to be reviewed to determine if the text message is acceptable to forward to the receiving user.

10. The system of claim 9, wherein the controller is further configured to notify the sending user, via the communication element, if the text message is determined to be not acceptable.

11. The system of claim 10, wherein the controller is further configured to block all messages from the sending user if the sending user sends more than a predetermined maximum number of messages that are determined to be not acceptable.

12. The system of claim 8, wherein the controller is further configured to compare a current time of day and a current day of week to message-receiving time and day preferences specified by the receiving user; and wherein, if the current time of day and current day of week is not within the message-receiving time and day preferences specified by the receiving user, the controller is further configured to store the text message from the sending user until the current time of day and current day of week is within the message-receiving time and day preferences specified by the receiving user.

13. The system of claim 8, wherein the body of the new text message further contains advertising text.

14. The system of claim 13, wherein the controller is further configured to:

determine a number of characters of the advertising text;

determine a number of characters of the text to be communicated to the receiving user;

sum the number of characters of the advertising text and the number of characters of the text to be communicated to the receiving user; and compare the sum to a predetermined maximum number of characters of the new text message to determine if the predetermined maximum number of characters has been exceeded.

15. A method for broadcasting text messages to anonymous recipients, the method comprising:

providing a database of potential recipients of text messages, the database comprising a mobile telephone number of each potential recipient, a pre-assigned unique alias for each potential recipient, and profile data for each potential recipient, the profile data comprising a plurality of personal characteristics and an indication each potential recipient's desire to receive broadcast messages;

receiving a first text message from a sender to be sent to a desired subset of the potential recipients, the text message comprising text to be communicated to the desired subset of potential recipients;

receiving, from the sender, one or more criteria corresponding to personal characteristics of the desired subset;

identifying potential recipients whose profile data matches the one or more criteria and whose profile indicates a desire to receive broadcast messages, such that the desired subset comprises the identified potential recipients;

determining a telephone number of each potential recipient in the desired subset using the database of potential recipients;

creating a plurality of second text messages, each second text message to be sent to a respective potential recipient in the desired subset, each second text message comprising a header and a body, the header containing the telephone number of the respective potential recipient in the desired subset, the body containing the text to be communicated to the desired subset of potential recipients; and sending the plurality of second text messages to the desired subset.

16. The method of claim 15, wherein the first text message is received via a user interface.

17. The method of claim 16, wherein access to the user interface is controlled.

18. The method of claim 15, wherein each second text message further comprises identification of the sender selected from the group consisting of a telephone number of the sender and a pre-assigned unique alias of the sender.

19. A system for broadcasting text messages to anonymous recipients, the method comprising:

a controller;

a communication element; and a memory element;

wherein the memory is configured to store a database of potential recipients of text messages, the database comprising a mobile telephone number of each potential recipient, a pre-assigned unique alias for each potential recipient, and profile data for each potential recipient, the profile data comprising a plurality of personal characteristics and an indication each potential recipient's desire to receive broadcast messages;

wherein the controller is configured to receive a first text message from a sender to be sent to a desired subset of the potential recipients, the text message comprising text to be communicated to the desired subset of potential recipients;

wherein the controller is configured to receive, from the sender, one or more criteria corresponding to personal characteristics of the desired subset;

wherein the controller is configured to identify potential recipients whose profile data matches the one or more criteria and whose profile indicates a desire to receive broadcast messages, such that the desired subset comprises the identified potential recipients;

wherein the controller is configured to determine a telephone number of each potential recipient in the desired subset using the database of potential recipients;

wherein the controller is configured to create a plurality of second text messages, each second text message to be sent to a respective potential recipient in the desired subset, each second text message comprising a header and a body, the header containing the telephone number of the respective potential recipient in the desired subset, the body containing the text to be communicated to the desired subset of potential recipients; and wherein the communication element is configured to send the plurality of second text messages to the desired subset.

20. The system of claim 19, wherein controller is configured to receive the first text message via a user interface.

21. The system of claim 20, wherein access to the user interface is controlled.

22. The system of claim 19, wherein each second text message further comprises identification of the sender selected from the group consisting of a telephone number of the sender and a pre-assigned unique alias of the sender.

* * * * *